INVENTOR
RICHARD F. MCINTOSH
BY
ATTORNEY

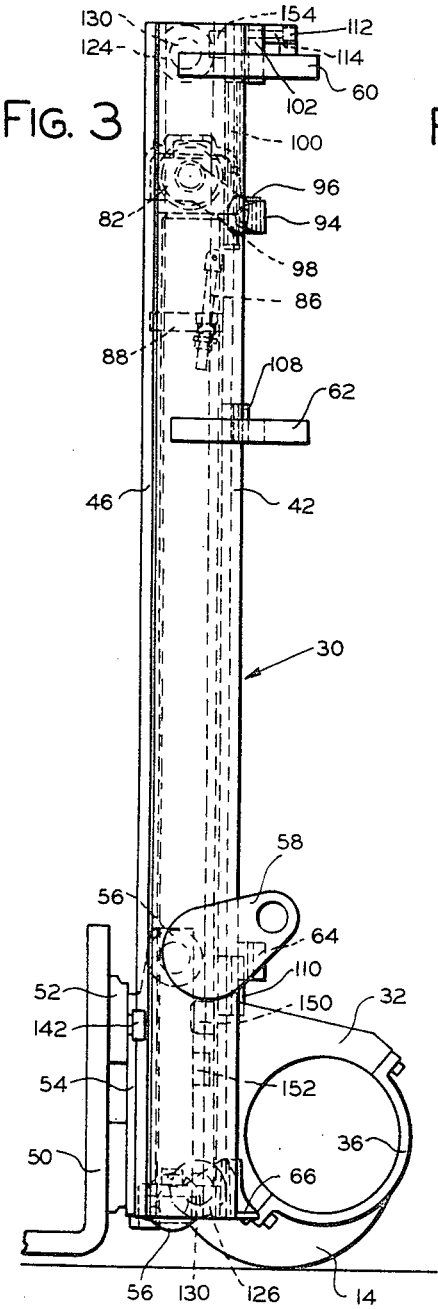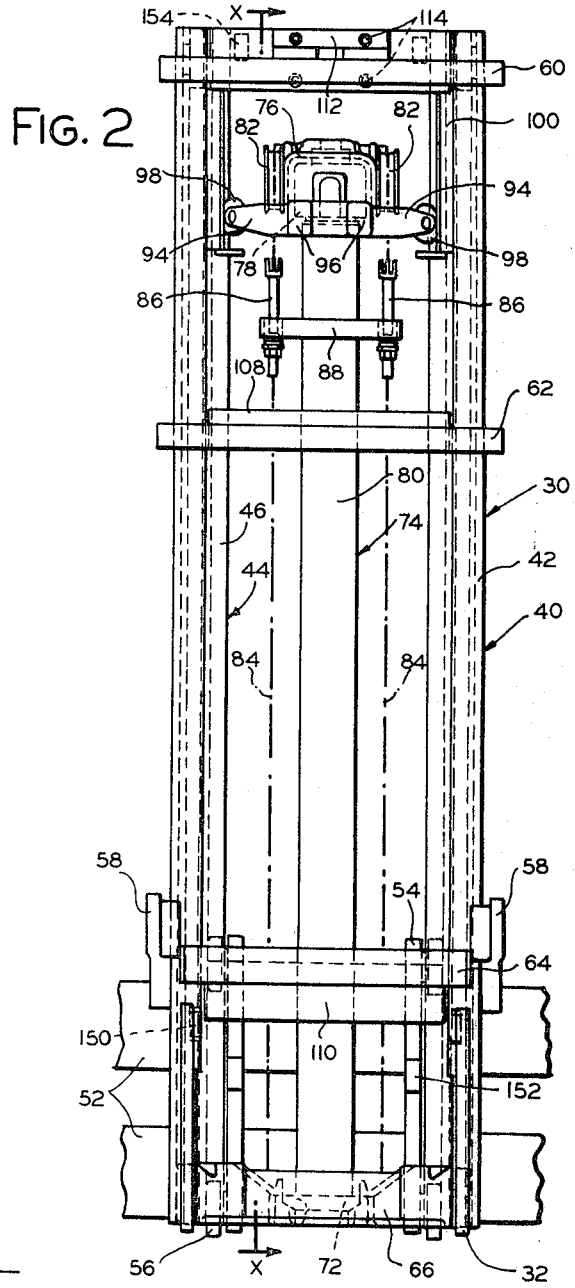

March 18, 1969   R. F. McINTOSH   3,433,325
METHOD AND MEANS FOR ADJUSTING AND ASSEMBLING
LIFT TRUCK UPRIGHTS
Filed Aug. 21, 1967

INVENTOR
RICHARD F. McINTOSH
BY J. P. Wierle
ATTORNEY

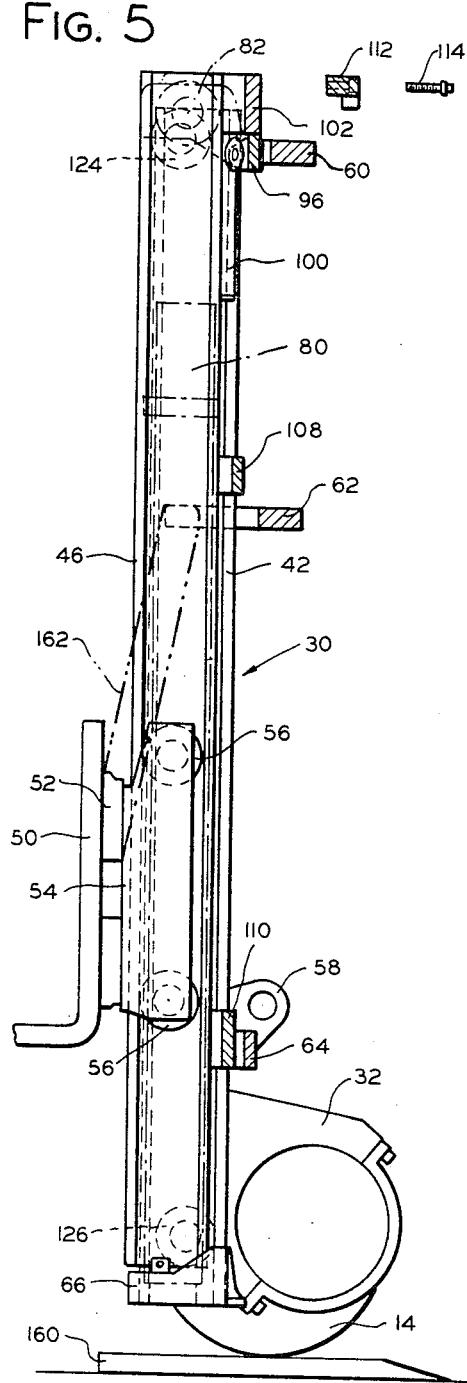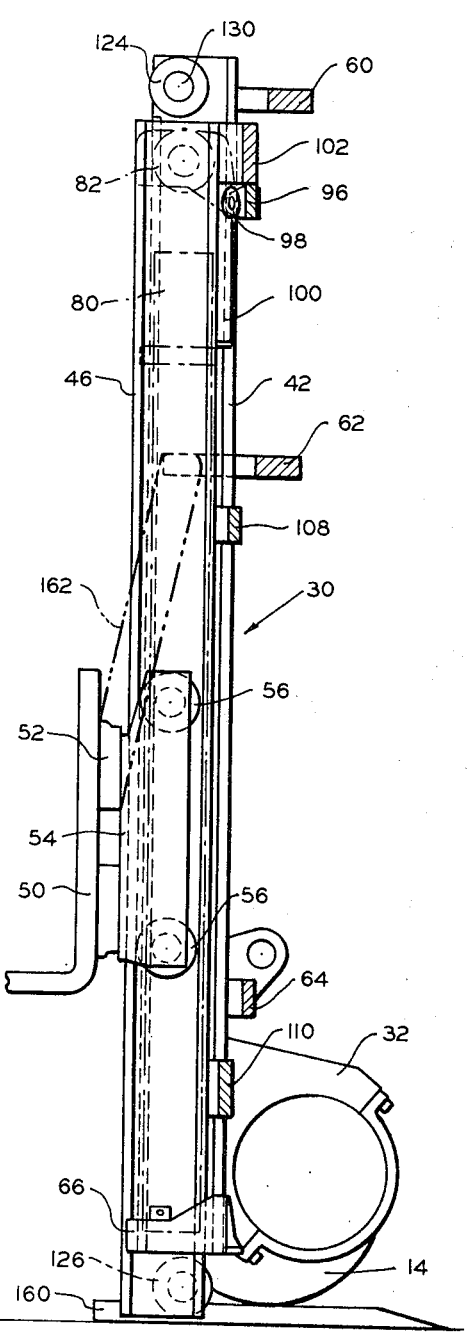

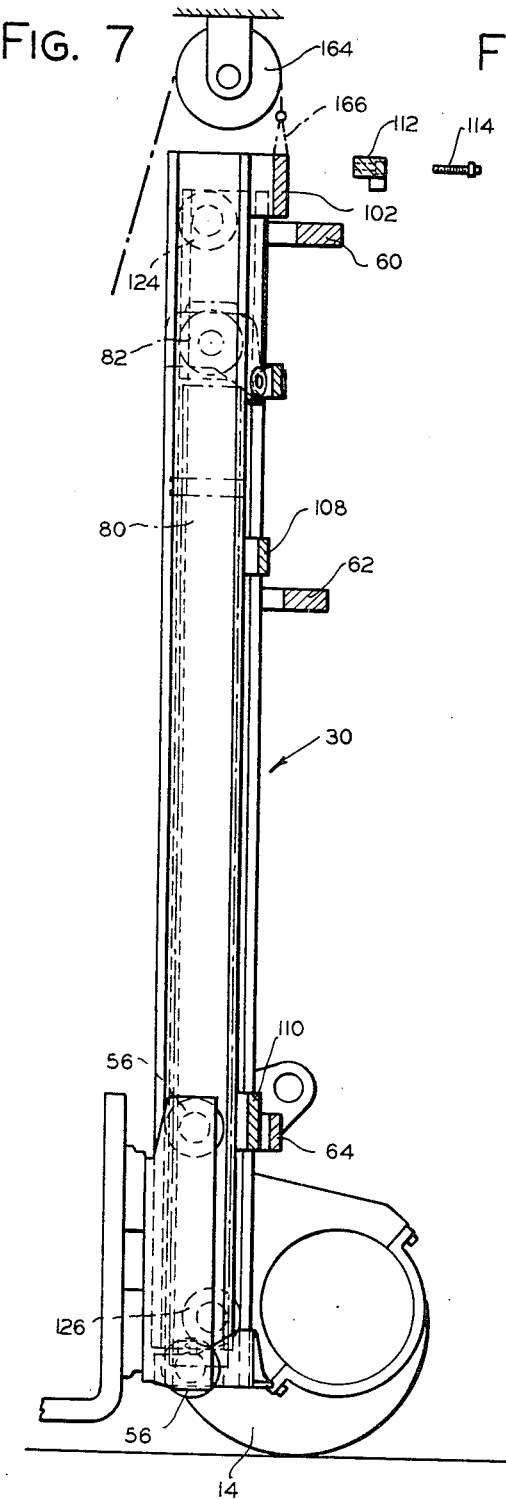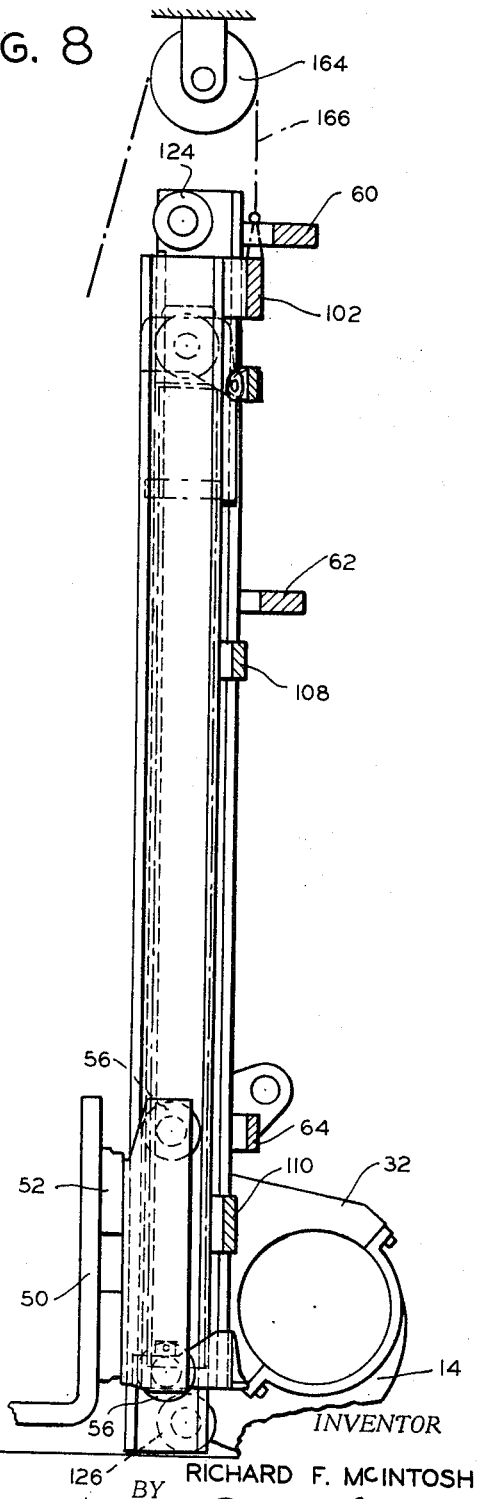

INVENTOR
RICHARD F. MCINTOSH
BY
ATTORNEY

United States Patent Office 3,433,325
Patented Mar. 18, 1969

3,433,325
METHOD AND MEANS FOR ADJUSTING AND ASSEMBLING LIFT TRUCK UPRIGHTS
Richard F. McIntosh, Battle Creek, Mich., assignor to Clark Equipment Company, a corporation of Michigan
Filed Aug. 21, 1967, Ser. No. 662,171
U.S. Cl. 187—9                    15 Claims
Int. Cl. B66b 9/20, 7/02

ABSTRACT OF THE DISCLOSURE

A lift truck roller mounted extensible mast which includes removable stop and/or connecting means operably located between outer and inner mast sections. One of the mast sections and the stop or connecting means are manipulatable and constructed so as to provide an improved structure and method for assembling the mast sections with the guide rollers being mountable thereon subsequent to assembly thereof, and an improved method for adjusting and/or replacing any or all of the guide rollers subsequent to assembly of the mast sections and without disassembling the mast sections one from the other.

Background of the invention

The field of art to which the invention pertains includes elevators, and more specifically portable elevators.

It has long been a problem in the art to which this invention pertains to construct a roller mounted extensible type mast for lift trucks which provides both a sound and safe construction of reasonable cost, and is also capable of being serviced in a relatively short time with little inconvenience, particularly as regards ready adjustment or replacement of the guide rollers which support each extensible rail section from the next outer rail section.

Heretofore it has been common to construct lift truck roller mounted mast such that to adjust or replace the guide rollers on a rail section of the mast it has been necessary either to first completely disassemble the rail sections one from the other thereby necessitating special equipment such as overhead or truck cranes, or chain falls and the like, or to use relatively expensive threaded or similarly constructed removable roller shafts to enable the rollers to be adjusted or replaced without complete disassembly of the rail sections.

One well-known manner of mounting extensible sections is to mount the rollers all on the inner extensible supported section, with no rollers mounted on the next outer rail section. A two-stage mast construction of this type is shown, for example, in Johnson Patent 2,321,029 wherein guide rollers are all mounted from the webs of the extensible rail section for supporting it in the outer fixed mast section. In the Johnson patent only two such guide rollers are mounted from each side of the extensible mast section, as well as in exemplary Patent 2,759,562, although in other similar constructions three or more such rollers have been mounted from each side of the extensible section at predetermined vertically spaced intervals. One of the disadvantages of such a construction is the necessity of completely disassembling the rail sections one from the other in order to adjust or replace the rollers. The above-mentioned patents each utilizes a lower plate member secured across the bottom of the outer channels of the primary or fixed mast section in order to prevent the extensible mast section from being lowered below the outer mast section. Most commonly, rigidifying crossbrace members or tie-bars between the respective mast sections are used which overlap in such a manner as to prevent the downward movement of the extensible rail sections below the lowermost position of the next outer section, such as shown in Patent 3,231,047. As also shown in the latter patent, the aforementioned problem is attempted to be alleviated by an upright construction which involves the use of a longer extensible mast section than the fixed mast section so that the extensible section extends above the upper ends of the stationary section when fully lowered, guide rollers being mounted from the top edge portion of the fixed section enabling at least the latter guide rollers to be more readily replaced and serviced.

Another solution to the problem is disclosed and claimed in Patent 3,213,967 wherein guide rollers are mounted on shafts secured adjacent the top and bottom of intermediate and inner mast sections, respectively, of a triple-stage upright therein disclosed, with the inner extensible I-beam mast section nested in interlocking relation with the intermediate I-beam mast section, the respective flanges of which are cut away at the upper front end of the intermediate section rails and at the lower rear end of the inner section rails so that the respective rollers are able to bypass one another through the respective flange cutouts in assembling and disassembling the mast sections. This permits the guide rollers and shafts to be preassembled and secured to the rails while also enabling the use of relatively low cost roller shafts which may be welded to the webs of the rails. However, while the latter arrangement has proven satisfactory in commercial use, there remains the disadvantage of having to disassemble the rail sections in order to replace or adjust the guide rollers. Again, overlapping tie-bars or transverse brace plates between the sides of the mast sections prevent lowering any of the extensible mast sections below the lowermost position of the next outer section.

Summary

My invention is capable of a number of different embodiments or forms. Tht basic embodiment disclosed herein comprises a lift truck mast construction having an inner telescopic guide roller mounted mast section and an outer fixed mast section, in which major components such as the telescopic mast section and the lift cylinder are manipulatable in accordance with one or more methods which allow installation, adjustment and replacement of the guide rollers between the mast sections after the upright is fully assembled and without the need for extraneous equipment, such as a crane or the like, to disassemble the mast sections one from another. It is immaterial whether each guide roller shaft is constructed to be removable from the respective webs or are welded in position, although of course, weldments comprise a lower cost means of attachment.

In carrying out my invention I have conceived various methods for manipulating one or more of the upright components involved, all which methods result in enabling the inner mast section of a two-stage upright to be lowered below the outer fixed mast section so as to expose both upper and lower guide rollers for installation, adjustment or replacement, as aforesaid, which lowered position is sometimes referred to herein as "negative lift." The structure and various methods for accomplishing this result will appear in detail below.

It is a primary object of the invention to provide methods and means for enabling guide rollers in a certain type of lift truck upright to be serviced with minimum "down time" and with relative ease, and without requiring disassembly of the upright.

Brief description of the drawing

FIGURE 2 is an enlarged elevational rear view of the mast shown in FIG. 1;

FIGURE 3 is a side view in elevation of the mast of FIG. 2;

FIGURES 5 and 6 are somewhat schematized vertical side sectional views taken along line x—x of FIG. 2 with the lift cylinder shown in broken lines to illustrate one method of manipulating the mast for servicing the guide rollers;

FIGURES 7 and 8 are views similar to FIGS. 5 and 6, but show another method of manipulating the mast.

*Description of the preferred embodiment*

Figure 1:
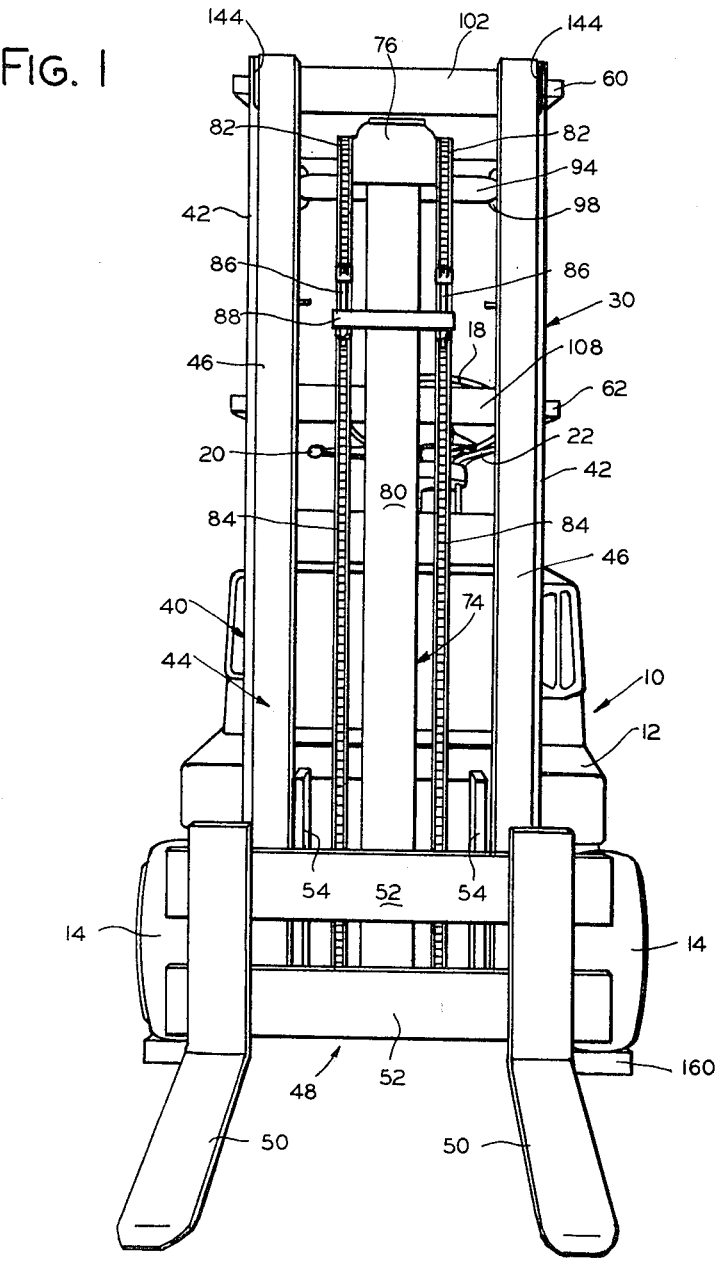
FIGURE 1 is a front view of a lift truck having mounted thereon a mast which embodies my invention.

Referring to FIGS. 1–4, a conventional industrial lift truck is shown at numeral 10 having a frame and body construction 12 mounted on a pair of steering wheels, not shown, at the rear end thereof and a pair of traction wheels 14 forwardly thereof. The truck embodies suitable electric or internal combustion prime mover means and drive line components for operating the truck from an operator's compartment 16, which includes an operator's seat mounted above the engine compartment, operator's foot controls, such as accelerator pedal and brake, not shown, and a plurality of hand controls and instrumentation some of which can be seen through the upright including a steering wheel 18, a control lever 20 for operating the upright, and a power train control lever 22 on the steering post.

The upright assembly of the present invention is illustrated generally at numeral 30, it being mounted on the truck by means of a pair of rearwardly extending support or trunnion plates 32 of the upright assembly which are adapted to be pivotally mounted by means of openings 36 thereof upon bearing portions of the drive axle, not shown, in known manner. It comprises in general a fixed mast section 40 which includes a pair of transversely spaced opposed channel members 42 of substantially C-shaped cross-section, to the rear flanges of which are secured trunnion plates 32, channel members 42 being arranged to receive an inner mast section 44 formed of two laterally spaced I-beams 46, the latter section being guide roller supported in mast section 40 and arranged for longitudinal movement relative thereto. A known fork carriage construction 48 includes generally a pair of fork tines 50 supported from a pair of vertically spaced fork bars 52 to which are connected for elevation in inner mast section 44 a pair of fork brackets 54 to each of which is mounted a pair of vertically spaced guide rollers 56 engaging the inner channels of I-beams 46. A bracket 58 extends rearwardly of each channel member 42 for connection to the rod ends of a pair of upright tilt cylinders, not shown, pivotally connected to the truck for tilting the upright forwardly and rearwardly on its front axle mounting, as is well-known.

Figures 4, 4A:
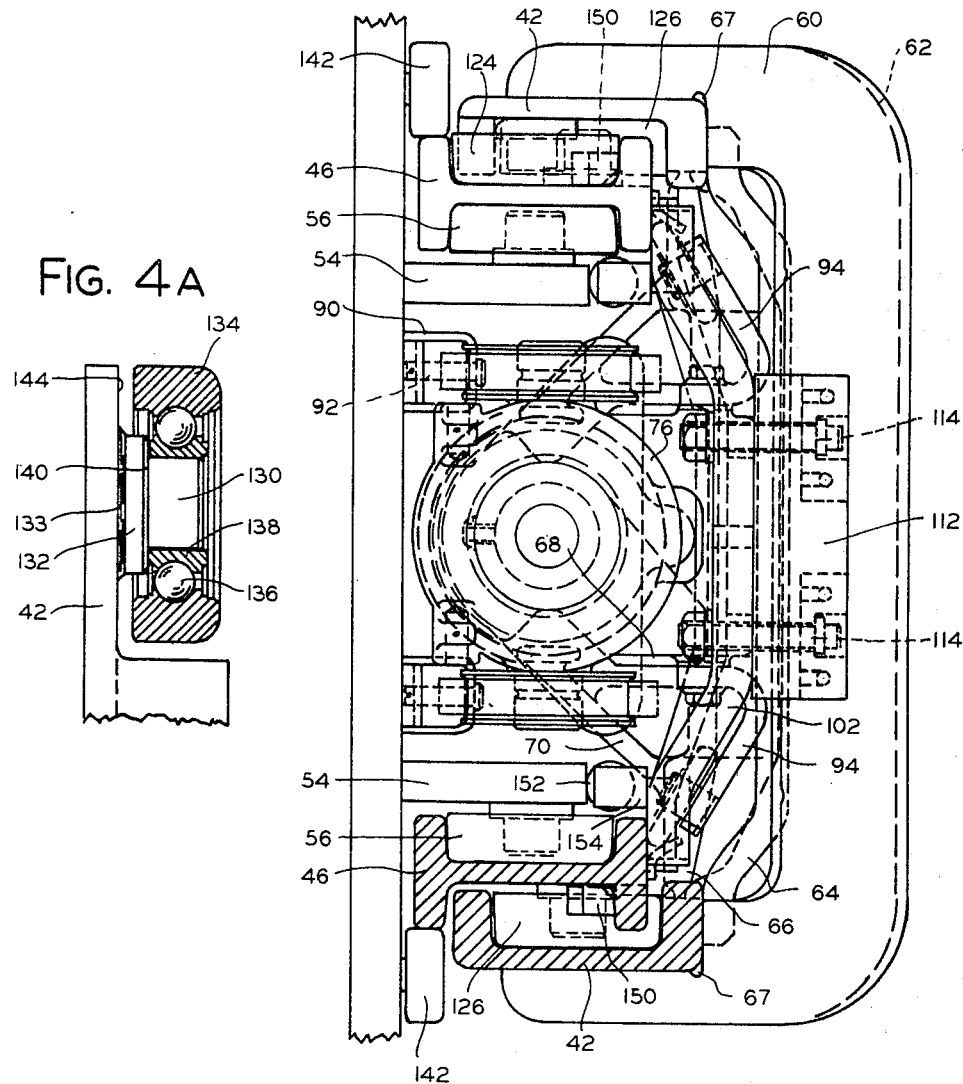
FIGURE 4 is an enlarged plan view in partial section of the mast of FIG. 2.
FIGURE 4A is a sectional view of one of the guide roller and shaft assemblies of the mast.

Mast section 40 is cross-braced for rigidity at the rear side thereof by means of vertically spaced and transversely extending tie-bar members 60, 62, 64 and 66, brackets 60 and 62 of which are relatively large C-shaped members, the flanges of which are notched at 67 to conform to the rear corner sections of channels 42 and secured, as by welding, to the web and rear flange portions of said channels, as best shown in FIG. 4. Tie-bar or brace member 64 is secured to the rear flanges of channels 42 and is shaped to provide a rearwardly extending vertical space which allows the passage of tie-bar members secured to the rear flanges of I-beams 46, as will be described. Tie-bar 66 functions mainly as a supporting bracket for a hydraulic piston and cylinder assembly 74 and is secured at its opposite ends to the rear flanges of channels 42, being formed with forwardly extending and biased strut members 68 and 70 supporting a partial ring 72 centrally of the lower end of the mast in which is mounted cylinder assembly 74.

Piston and cylinder assembly 74 is of a well-known type, such as is shown in above-mentioned Patent 3,213,967. In FIGS. 1–4 it is shown in a collapsed position, wherein a cross-head 76 is carried at one end of the piston rod 78 actuatable by a piston head, not shown, in extension and retraction in cylinder 80, which is supported at the bottom end thereof in the socket provided by ring 72. An inlet port, not shown, is adapted to connect the bottom end of cylinder 80 with a source of pressure fluid on the lift truck. A pair of laterally spaced sheaves or sprockets 82 are rotatably mounted on shafts on opposite sides of cross-head 76, on which are reeved a pair of lifting chains 84 anchored at their one ends by means of members 86 to an anchor plate 88 secured on cylinder 80, and anchored at the opposite ends to a pair of anchor members 90 secured at the rear side of lower fork bar 52 by members 92. The upper end of cylinder assembly 74 is supported on I-beam rails 46 by means of a pair of forwardly biased brackets 94 which are secured to a pair of transversely spaced rearwardly extending stop blocks 96 which are preferably cast into cross-head 76. At opposite ends of each bracket 94 is mounted a biased roller 98 engaging one of a pair of short vertical angle tracks 100 which are secured to the upper rear flange portions of inner rails 46 immediately below an upper tie-bar member 102 which is secured to the rear sides of the rear flanges of inner rails 46. In addition to tie-bar 102, tie-bars 108 and 110 are secured to the rear flanges of rails 46 in the upper central and lower portions of the upright assembly and adjacent to outer mast tie-bars 62 and 64 when the mast is in a collapsed position. The inner mast section is supported by the outer mast section in its collapsed position, as shown in FIGS. 1–4, by a removable stop block 112 which is adapted to overlap upper outer tie-bar 60 and rest in abutment therewith when the mast is collapsed, said stop block being secured to the rear side of inner upper tie-bar 102 by four bolt and nut assemblies 114. As may best be seen in FIG. 3, block members 96 underlap tie-bar 102 so that following the first portion of extension of piston rod 78, during which "free-lift" operation of fork carriage 48 occurs, block members 96 then contact the underside of tie-bar 102 to elevate with cylinder assembly 74 inner mast section 44 to a maximum lift position, during which fork carriage 48 travels at a 2:1 movement ratio to the top of extended inner mast section 44. It will be noted that the upper or cross-head end of the cylinder assembly is continuously supported in tracks 100 by roller and bracket assemblies 94, 98.

It will be noted that in the particular upright configuration illustrated in the drawings, which is similar to that described in detail in Patent 3,213,967, the inner I-beam 46 are nested in channels 42 in such a manner that the forward flanges of the I-beams are disposed forwardly of the forward flanges of the channels, and the rear flanges of said I-beams are disposed within channels 42 and forwardly of the rear flanges of the channels. Upper and lower pairs of guide rollers 124 and 126, are mounted on corresponding pairs of stub shaft members 130, 130 which may be welded, or otherwise fixedly secured, to the webs of the nested pairs of I-beams and channels, respectively, for supporting the I-beam rails for extension and retraction in channel sections 42. Likewise, the upper and lower pairs of rollers 56, 56 may be mounted on similar stub shafts which are secured to fork brackets 54.

Each guide roller and shaft assembly is as shown in detail in FIG. 4A; it comprises a stub shaft 130 having a flanged end 132, the back surface 133 of which is preferably welded to the respective web sections of the I-beam and channel section rails, and to the fork brackets 54, as shown. Each roller, as shown, has outer roller portion 134 mounted on a ring of ball bearings 136, and an inner race 138 having a sliding fit with shaft 130 and readily mountable and demountable manually thereon. One or more shims 140 (one is shown in FIG. 4A) are ordinarily mounted on each shaft 130 between flanges 132 and the side of the roller race at the time of assembly in the upright so that the tightness or clearance in a lateral direction of the upright rails and of the fork carriage may be readily adjusted. In practice I prefer to use guide rollers which are slightly cocked or canted in opposite directions as described in detail in above-mentioned Patent 3,213,967. For the purpose of simplicity, however, they are shown here without such canting, having their axes of rotation normal to the web of the rail or fork bracket to which each shaft 130 is secured. In addition to the guide rollers, a pair of side thrust rollers 142, FIGS. 3 and 4, are connected to the carriage 52 and are adapted to roll along the outer offset edge portion of each inner I-beam member 46, said pair of side thrust rollers cooperating with the lower inner carriage support rollers 56 for preventing a tendency of the upright to spread apart or wedge when the load carriage is eccentrically loaded, and for resisting side thrust forces imposed upon the load carriage.

Cutouts 144 are provided in the upper corner portion of the forward flange of each channel beam member 42, and in the lower corner portion of the outwardly extending rearward flange of each I-beam member 46 (FIG. 4) so that relatively large diameter guide rollers 124 and 126 may be mounted on shafts 130 within the respective mast sections such that the rollers extend through the respective cutout flange portions with attendant advantages as described in said Patent 3,213,967. Cutouts 144 are relatively short in length (FIG. 4A) so that the guide rollers cannot bypass one another for assembly and disassembly, as is the case in the construction disclosed in above Patent 3,298,463, for example. Thus, as will be apparent to persons skilled in the art, a tertiary safety feature is provided which functions to prevent possible separation of the upright sections during operation in the event of a loss or shearing off for any reason of internal secondary safety stop members 150, which are secured, as by welding, to the rear outer corner portions of I-beam rails 46 in predetermined vertically spaced relation above lower rollers 126 and below upper rollers 124. A pair of additional safety stop members 152 and 154 are secured in overlapping relationship to each of fork brackets 54 and opposite side portions of tie-bar 104, respectively, to limit the maximum extension of the fork carriage in inner mast section 44.

As pointed out above, the internal stops of cylinder assembly 74 will in all ordinary circumstances limit maximum extension of the various mast parts, and the foregoing secondary safety stop members will not, in normal operation, be effective to limit upright extension. However, in the event that manufacturing specifications for location of certain upright parts are not adhered to, for example, it is possible that the inner mast of the upright and the fork carriage could be extended to an unsafe elevation, which secondary safety stops 150 are located to prevent by abutting upper rollers 124 in the event they should be required to function to limit mast extension. In the unlikely event that neither the primary nor secondary stops function for any reason, the aforementioned tertiary safety feature provided by abutment of rollers 124 and 126 will prevent disengagement of the inner mast section from the outer mast section.

Referring now to FIGS. 5 and 6, I will describe one method of manipulating the upright of FIGS. 1–4 to facilitate adjustment or replacement of rollers 124 and 126. In this embodiment, cross-head 76 is elevated with piston rod 78 to elevate slightly the inner mast section 44 by means of block members 96 and tie-bar 102, at which location fork carriage 48 has been elevated in the inner mast section to the position shown in FIG. 5 wherein the fork carriage is slightly above its free-lift position which is reached when block members 96 first abut the tie-bar 102. Slight elevation of mast section 44 relieves the stress from the pair of bolts 114 of supporting the inner mast section on the outer mast section.

With the upright assembly located as in FIG. 5, a securing member, such as a strap, chain or any other suitable means, may be used to secure the fork carriage to the inner tie-bar 103, for example, or to any other suitable inner or outer mast member which may be located at a higher elevation than the portion of the carriage to which it is secured. This is represented in FIGS. 5 and 6 by a chain 162 which is threaded with minimum slack through the upright around tie-bar 103 and one of the fork bars 52. After thus securing the inner mast section to the fork carriage bolts 114 may be removed, thereby disconnecting stop member 112 from tie-bar 102, which removes the support of the inner mast section from the outermost section, at which point the inner mast section is supported by the cross-head 76. Cross-head 76 may then be lowered below its normal position of abutment with tie-bar 102, which effects a lowering of the inner mast section through its normal collapsed position to a "negative lift" position, as shown in FIG. 6. In the latter position lower rollers 126 and upper rollers 124 become fully exposed.

Figure 9:
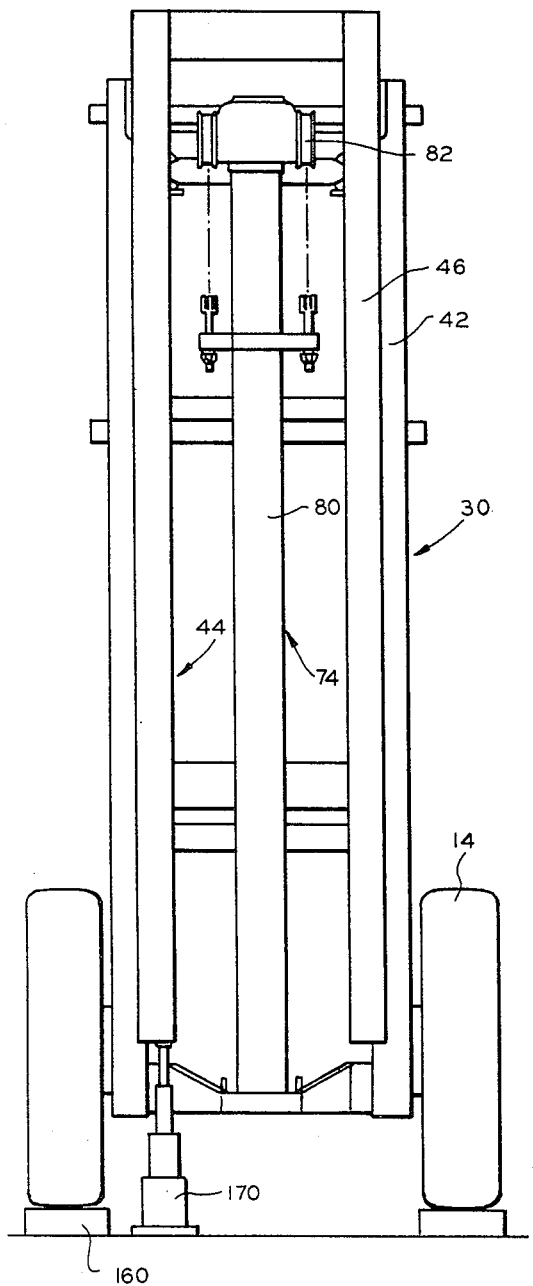
FIGURES 9 and 10 are somewhat schematized front elevational views of the upright construction of FIGS. 1–4 with the fork carriage removed, showing exemplary steps of a third method of manipulating the mast for servicing the guide rollers.
Figure 10:
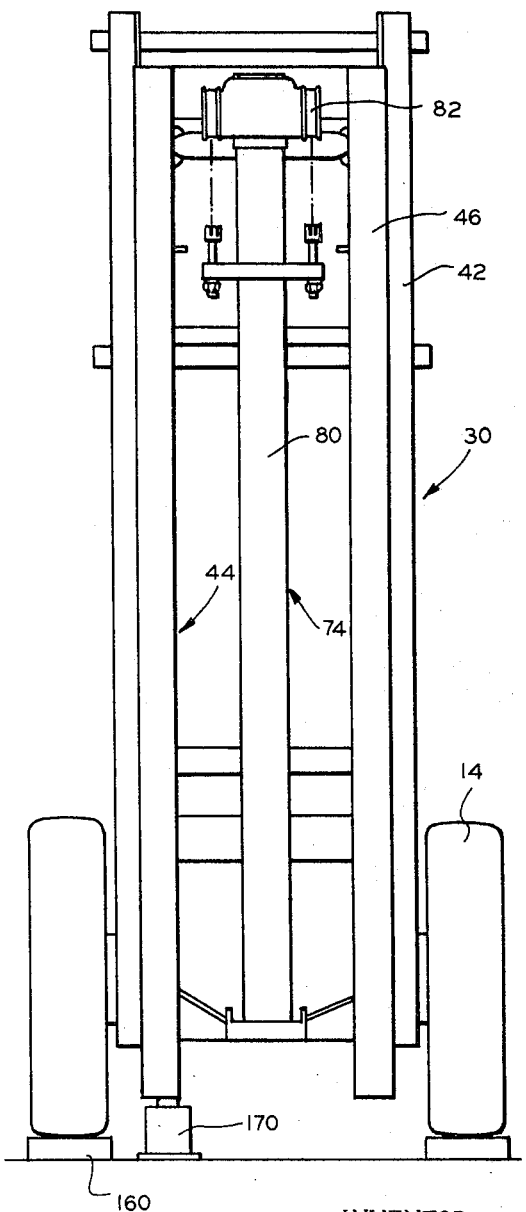

It will be noted in FIGS. 1, 5 and 6 that the lift truck is shown with the front wheels 14 located on a pair of short ramp members 160, the purpose of which is to elevate the upright assembly 30 an additional distance above floor level so that with the inner mast section lowered to a negative lift position there is sufficient space to enable the servicing of lower rollers 126, as will be apparent in viewing FIG. 6. In many upright constructions which are used with hard or cushion tyred lift trucks, there is insufficient vertical space in which to lower the inner upright sufficiently to completely expose the lower rollers for servicing. Any suitable means can, of course, be used to elevate the front of the truck for this purpose. Use of ramps 160 is exemplary of a simple means for providing such additional space. The use of larger pneumatic tires on lift trucks normally provides sufficient elevation of the upright above floor level to enable roller removal and adjustment without providing additional elevation as by ramps 160; see FIGS. 9 and 10 wherein the latter condition is represented.

The guide rollers 124 and 126, each comprising the assembly of FIG. 4A, are preferably manually mounted with a sliding fit on shaft 130, are held in position during operation of the upright between the webs of the respective mast rails, and are readily adjustable and/or replaceable manually by adding or subtracting shims 140 as required for upright lateral tightness, as aforesaid, and by manually sliding off and on each shaft 130 a new roller, all with the mast sections in the position shown in FIG. 6. Following roller replacement and/or adjustment, a reversal of the above procedure reconditions the upright for normal operation, as in FIGS. 1–3. That is, the mast section 44 is raised with carriage 48 from the FIG. 6 to the FIG. 5 position, at which bolts 114 are replaced to reconnect stop member 112 to tie-bar 102; chain 162 may then be removed, fork carriage 48 lowered, and the truck driven from ramps 160. It will be readily appreciated that complete roller servicing can be accomplished with little time and effort, that no extraneous equipment is required, such as overhead cranes, and the like, and that, as a consequence, the procedure can be implemented wherever the lift truck may be located.

It will also be appreciated that original assembly and adjustment of the upright by the manufacturer is greatly facilitated by this invention. Correct initial lateral adjustment of the mast at the factory is very important since normally the adjustment is not required to be altered for a high percentage of the operating life of the mast. Heretofore, as pointed out in general in the above entitled "Background of the Invention," no really adequate solution to the problem had been devised. By means of my invention, both original factory assembly of mast sections and adjustment of guide rollers is greatly simplified in that the mast sections 40 and 44 may be assembled without any of guide rollers 124 or 126 mounted on shafts 130. Further, in the nested I-beam construction disclosed, shafts 130 of rollers 124 are displaced forwardly of shafts 130 of rollers 126 and, consequently, they may with facility be welded in position prior to mast section assembly, and be manipulated to readily bypass each other during such assembly. The mast section 44 is telescoped into the mast section 40 during factory assembly, preferably with the mast sections in a horizontal position, to the negative lift position in FIG. 6 in which rollers 124 and 126 may be readily mounted by hand and adjusted for predetermined upright lateral tightness by shims 140. It will be also noted that during assembly of the mast sections, stop members 150 are enabled to be welded in position prior to assembly of the mast sections, and to bypass upper shafts 130 on outer rails 42 during assembly, thus further facilitating the attachment of the various parts in the mast sections and the assembly of the mast sections. Cylinder assembly 74 is next mounted and connected to the various other upright components, and carriage 48 assembled and connected in the upright. The above procedure greatly simplifies and hastens factory assembly and adjustment of lift truck uprights over any procedure known heretofore.

FIGS. 7 and 8 illustrate another embodiment of the invention wherein an overhead crane mechanism or chain fall, illustrated in the figures schematically by a pulley and cable assembly 164 and 166, is utilized for raising and lowering the inner I-beam section as an alternative to the use of chain 162 of FIGS. 5 and 6. Thus, cable 166 or equivalent support means may be attached to tie-bar 102 laterally outwardly of stop member 112, the inner I-beam section raised to relieve the stress on stop member 112, and bolts 114 then removed so that mast section 44 can be lowered by the pulley and cable to the position shown in FIG. 8, in which guide rollers 124 and 126 are exposed as in FIG. 6 for adjustment and/or replacement. A reversal of the above procedure will, of course, return the upright assembly to its original operating condition. It will be noted that the foregoing procedure does not necessitate elevation of the lift cylinder and fork carriage, although some elevation thereof may be found desirable to provide additional space for servicing the lower rollers.

Yet another readily available means for manipulating the upright to carry out the invention herein employs a simple jack 170 or equivalent hoist device. For purposes of clarification, I have not shown the fork carriage in the latter figures. It may be found desirable to elevate the carriage to at least a partial free-lift position, and block the same in said position so that it cannot interfere with guide roller servicing. On the other hand, in the embodiment of FIGS. 9 and 10 wherein a pneumatic tyred truck is blocked by members 160, elevation of the fork carriage above its normal down position may not be required. In any event, jack member 170 may be utilized to elevate inner mast section 44, the same as it is elevated in FIG. 5 by cylinder assembly 74 and in FIG. 7 by cable 166, at which elevation stop member 112 is detached, as previously, and the inner mast section then lowered by jack 170 to the FIG. 10 position, at which the rollers are serviced, as previously, subsequent to which a reversal of the above procedure will recondition the upright assembly for normal operation. In the use of a jack or equivalent device 170, it may be necessary or desirable to use higher ramps than ramps 160 with cushion tyred lift trucks, in order to provide adequate room of the jack in manipulating the inner mast section between the negative lift and raised positions shown in the latter figures. The use of an overhead chain fall, or jack, may be found particularly desirable in instances where the lift truck hydraulic system is being serviced, for example, making temporarily inoperative cylinder assembly 74. By use of such extraneous means for manipulating the inner mast section, the guide rollers can be serviced without necessitating operation of the cylinder assembly.

The basic structure and method of my invention can obviously be used in uprights which vary in configuration, the particular upright requirements involved dictating the resulting design, including the number, location and design of tie-bars, stops, ram support brackets, ram motor elements, and the like. It is intended that all such variations and equivalents thereof which fall within the scope of the present invention be covered herein. The embodiments of my invention described in detail above are intended to be exemplary in character only, and this disclosure is intended for purposes of illustration and not as a limitation of the scope of the invention. Numerous variations and modifications may be made to suit different requirements, and other changes, substitutions, additions and omissions may be made in the construction and arrangement of the parts, and in the method of manipulation of the parts, without necessarily departing from the scope of the invention.

As a result, it is not my intention to be limited to any particular form of the invention herein illustrated and described except as may appear in the claims appended.

I claim:

1. A mast assembly for lift truck comprising an outer channeled mast mounted from the truck, an inner channeled mast mounted for elevation on the outer mast, load engaging means mounted for elevation on the inner mast, roller means supporting the inner mast on the outer mast including lower roller means mounted on and adjacent the outer lower end portion of the inner mast and engaging the adjacent channel of the outer mast, and means supporting the inner mast from the outer mast in a vertical direction when the inner mast is lowered, said latter means being manipulated to permit said inner mast to be lowered to a negative lift position relative to said outer mast, and said lower roller means being exposed and replaceable when the inner mast is in negative lift position.

2. A mast assembly as claimed in claim 1 wherein each of said outer and inner masts comprise a pair of vertically extending and transversely spaced channeled members and a transversely extending brace member connecting the side portions of each of said pairs, said manipulatable means being secured to an inner mast brace member and normally overlapping in a collapsed mast position an adjacent outer mast brace member which normally prohibits said inner mast to be lowered to said negative lift position.

3. A mast assembly as claimed in claim 1 wherein hydraulic motor means is mounted in said mast assembly for elevating the inner mast relative to the outer mast, said motor means having a collapsed height less than the collapsed height of the mast assembly and adapted to engage said inner mast for elevation following a predetermined extension of the motor means, said motor means being also adapted to lower said inner mast to said negative lift position when said manipulatable means is manipulated out of supporting relation with said outer mast.

4. A mast assembly as claimed in claim 2 wherein said outer mast brace member has a generally C-shaped configuration and said inner mast member is adapted to pass downwardly through the opening of the C-shaped member when said manipulatable means is manipulated out of supporting relation with said outer mast.

5. A mast assembly as claimed in claim 2 wherein said pair of inner mast members includes outwardly extending rearward flange portions extending into the outer mast channel members, and upper roller means mounted on and adjacent the upper end portions of the outer mast members for engaging said flanges, said upper roller means being also exposed and replaceable when the inner mast is in said negative lift position.

6. A hoist mechanism for lift trucks comprising a two-section load lifting frame wherein said sections are in telescoping relation to one another, one section having a pair of laterally spaced channeled members opening inwardly, each member having forward and rearward flange portions, the second section having a pair of laterally spaced I-shaped members nested within the first section such that one end flange of each I-shaped member is disposed forwardly of the forward leg portion of the adjacent channeled member and the other end flange is disposed inwardly of the adjacent channeled member, a first roller mounted in the upper end portion of each outer channeled member and a second roller mounted in the bottom end portion of each I-beam member, said rollers supporting said second section for telescoping movement on said first section, a first transverse tie-bar securing said channeled members in fixed spaced relation and a second transverse tie-bar securing in fixed spaced relation said I-beam members, said second tie-bar having stop means connected thereto for supporting the second frame section vertically from the first frame section when the second section is in down position, said stop means being movable so as to permit a lowering of said second section below said collapsed position whereby to expose said first and second pairs of rollers.

7. A hoist mechanism as claimed in claim 6 wherein said stop means is detachable from said second tie-bar, said second tie-bar being movable downwardly below said first tie-bar when the stop means is detached.

8. A hoist mechanism as claimed in claim 6 wherein lift cylinder means is mounted for actuating said second section in telescoping relation to said first section, said lift motor being shorter in length than the collapsed height of said load lifting frame for raising and lowering said second section to both positive and negative lift positions relative to said first section, said roller means being exposed and serviceable when said second section is in said negative lift position.

9. A mast assembly as claimed in claim 1 wherein said roller means are mounted on stub shafts secured as by welding to said inner channeled mast members.

10. A method of assembling a lift truck upright having inner and outer channeled mast means including inner and outer transverse tie-bars securing opposite sides of the inner and outer mast means, respectively, and roller and roller shaft means supporting the lower portion of the inner mast means in the outer mast means, including the steps of lowering the inner mast means in the outer mast means to a negative lift position relative to the outer mast means, attaching the roller means to the roller shaft means on the inner mast means, elevating the inner mast means to a positive lift position relative to the outer mast means, connecting vertical support means to the inner mast means so as to overlap a portion of the outer mast means for supporting the inner mast means on the outer mast means, and lowering the inner mast means to a no-lift position relative to the outer mast means wherein said vertical support means abuts the outer mast means.

11. A method of assembling or servicing a lift truck upright as claimed in claim 10 wherein said vertical support means is connected to the tie-bar of the inner mast means in overlapping relation to the tie-bar of the outer mast means.

12. A method of servicing the guide rollers of a lift truck upright having an inner mast section mounted for extension and retraction in an outer mast section, the inner mast section having guide roller members mounted on lower opposite side portions thereof supporting it in the outer mast section, a hydraulic lift motor for raising and lowering the inner mast section in the outer mast section and means supporting the inner mast section directly from the outer mast section in a vertical direction when the inner mast section is in a no-lift position, comprising the steps of raising the inner mast section so that the overlapping portion of the vertical support means thereof is above the cooperating support means of the outer mast section, detaching the overlapping portion of the inner mast support means, lowering the inner mast section to a negative lift position relative to the outer mast section to expose said roller means, servicing said roller means while in said position, elevating the inner mast means to a positive lift position, replacing said overlapping vertical support means, and lowering said inner mast means to a no-lift position which is maintained by said vertical support means.

13. A method as claimed in claim 12 wherein a load lifting carriage means is mounted for elevation in the inner mast comprising the additional steps of elevating the load carriage partially on the inner mast and supporting it in said elevated position during servicing of said guide rollers with the inner mast in a negative lift position.

14. A method as claimed in claim 12 wherein said hydraulic lift motor is of shorter length than the inner mast section is operated to manipulate the inner mast section to both said positive and negative lift positions.

15. A method of manipulating a nested I-beam type upright of the type described for servicing upper and lower guide rollers mounted on outer and inner telescoping mast sections respectively, comprising the steps of elevating the inner mast, manipulating vertical support means of said inner mast relative to the outer mast thereby conditioning the inner mast to be lowered to a negative lift position relative to the outer mast, lowering said inner mast to a negative lift position wherein the said upper and lower guide rollers are exposed, servicing said upper and lower guide rollers, elevating said inner mast to a positive lift position relative to the outer mast, and manipulating said vetrical support means so as to condition the inner mast for vertical support by the outer mast.

References Cited
UNITED STATES PATENTS

| | | | |
|---|---|---|---|
| 2,936,047 | 5/1960 | Quayle | 187—9 |
| 3,252,545 | 5/1966 | Quayle | 187—9 |

RICHARD E. AEGERTER, *Primary Examiner.*

H. C. HORNSBY, *Assistant Examiner.*

U.S. Cl. X.R.

187—95

UNITED STATES PATENT OFFICE
CERTIFICATE OF CORRECTION

Patent No. 3,433,325  March 18, 1969

Richard F. McIntosh

It is certified that error appears in the above identified patent and that said Letters Patent are hereby corrected as shown below:

Column 1, line 72, cancel "the", first occurrence. Column 8, line 2, "of" should read -- for --; line 44, "manipulated" should read -- manipulatable --; line 47, after "in" insert -- said --; line 70, after "mast" insert -- brace --.

Signed and sealed this 14th day of April 1970.

(SEAL)
Attest:

Edward M. Fletcher, Jr.  WILLIAM E. SCHUYLER, JR.
Attesting Officer  Commissioner of Patents